United States Patent [19]

Lee

[11] Patent Number: 5,841,905
[45] Date of Patent: Nov. 24, 1998

[54] BUSINESS FORM IMAGE IDENTIFICATION USING PROJECTED PROFILES OF GRAPHICAL LINES AND TEXT STRING LINES

[75] Inventor: Yongchun Lee, Rochester, N.Y.

[73] Assignee: Eastman Kodak Company, Rochester, N.Y.

[21] Appl. No.: 738,206

[22] Filed: Oct. 25, 1996

[51] Int. Cl.[6] .................................................. G06K 9/00
[52] U.S. Cl. ........................................ 382/203; 382/199
[58] Field of Search .................................... 382/283, 176, 382/217, 254, 209, 269, 114, 202, 267, 199, 100, 101, 112, 113, 135, 137, 138, 168, 170, 171, 173, 175, 179, 180, 181, 190, 196, 197, 201, 203, 218, 224, 225, 227, 228, 270, 286, 287, 305, 306, 307, 312, 321; 358/467, 447, 404, 451, 455; 348/63

[56] References Cited

U.S. PATENT DOCUMENTS

| 4,949,392 | 8/1990 | Barski et al. ............................ 382/61 |
| 5,185,813 | 2/1993 | Tsujimoto ............................. 382/180 |
| 5,293,429 | 3/1994 | Pizano et al. ............................ 382/24 |
| 5,311,597 | 5/1994 | Rosenbaum ........................... 382/101 |
| 5,387,985 | 2/1995 | Loce et al. ............................. 358/447 |
| 5,404,411 | 4/1995 | Banton et al. ........................... 382/54 |
| 5,515,453 | 5/1996 | Hennessey et al. ................... 382/218 |
| 5,572,601 | 11/1996 | Bloomberg ............................ 382/175 |
| 5,586,196 | 12/1996 | Sussman ................................ 382/114 |

OTHER PUBLICATIONS

Roger L.T. Cederberg, Chain–Link Coding and Segmentation for Raster Scan Devices, Computer Graphics and Image Processing 10 (1979), pp. 224–231. By Academic Press, Inc.

Primary Examiner—Leo H. Boudreau
Assistant Examiner—Bijan Tadayon
Attorney, Agent, or Firm—Edward Dugas

[57] ABSTRACT

A method of identifying business forms that uses contour polygons constructed from linear line segments. Wherein contour polygons are derived from a windowed raster scan of the forms' image. Each of the contour polygons is examined to determine if it represents a text component or a graphic component. All text contour polygons and graphic contour polygons are grouped and profiled. The accumulated profiles are compared against a library of stored profiles of known forms so as to determine a best match thereby identifying the unknown form.

5 Claims, 19 Drawing Sheets

70

55

| NAME | |  |
|---|---|---|
| ADDRESS | | |

| CASH | DIVIDEND | TOTAL COST |
|---|---|---|
|  |  |  |
|  |  |  |
|  |  |  |
|  |  |  |
|  |  |  |
|  |  |  |
|  |  |  |
|  |  |  |

| DATE | APPROVED BY |
|---|---|

FIG. 3

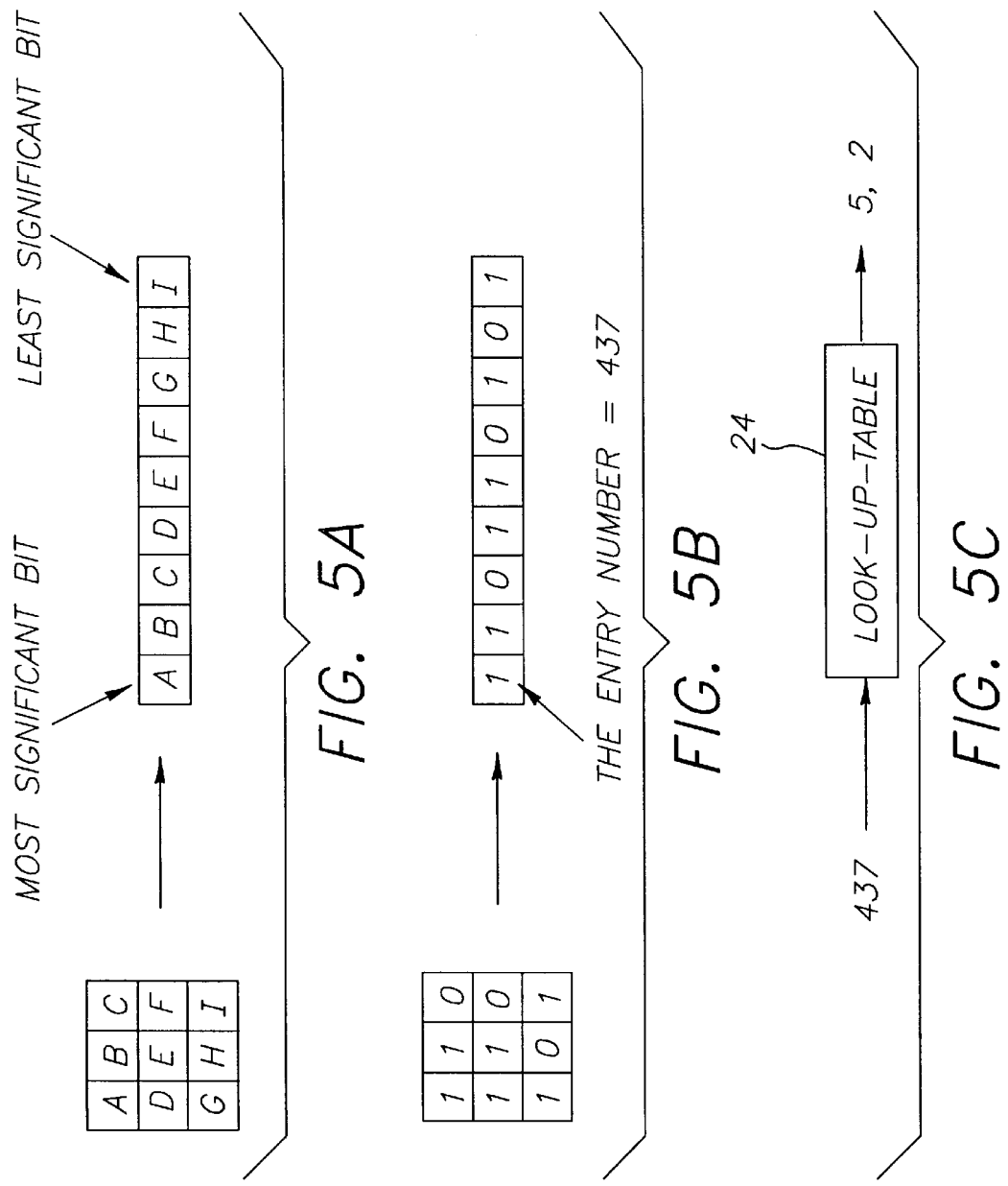

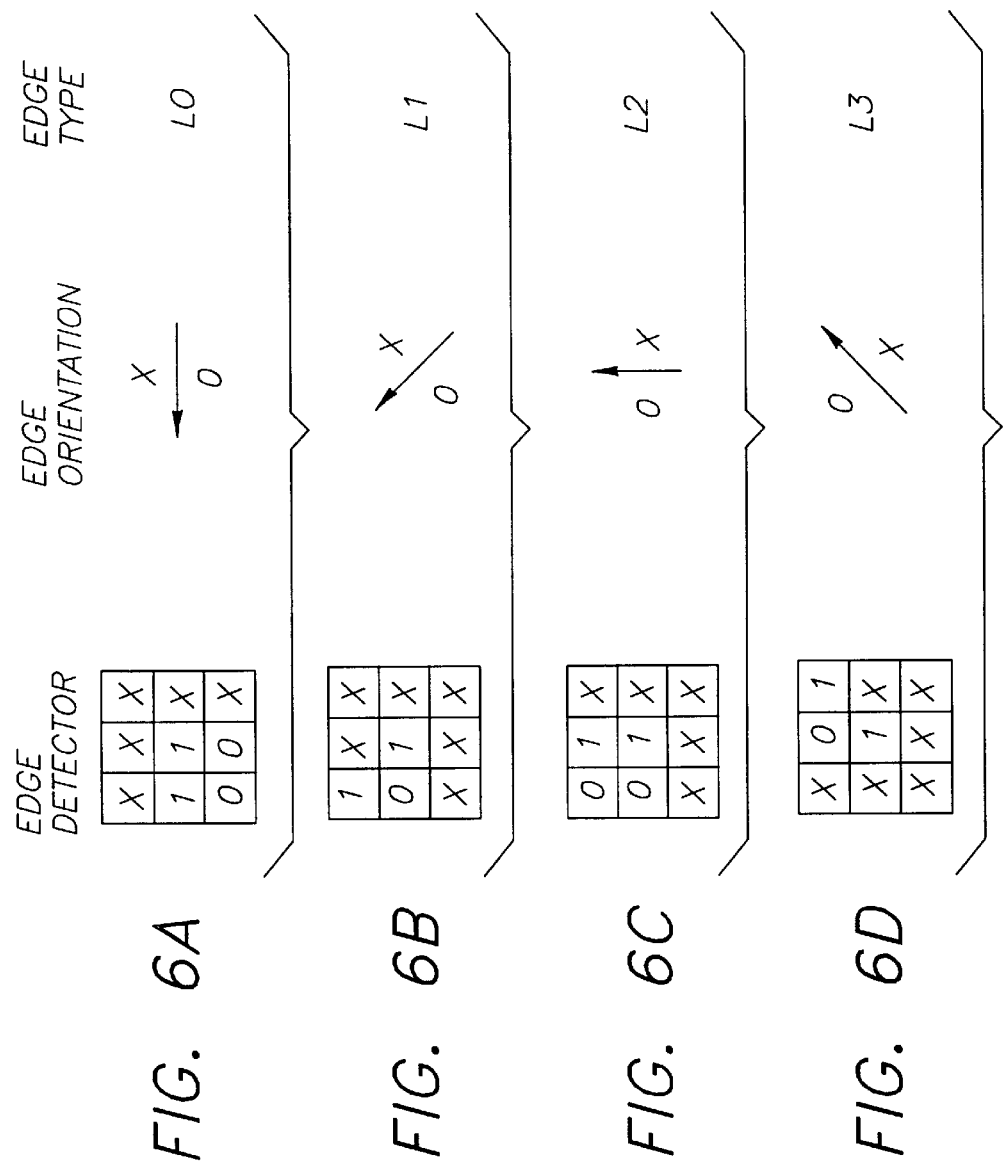

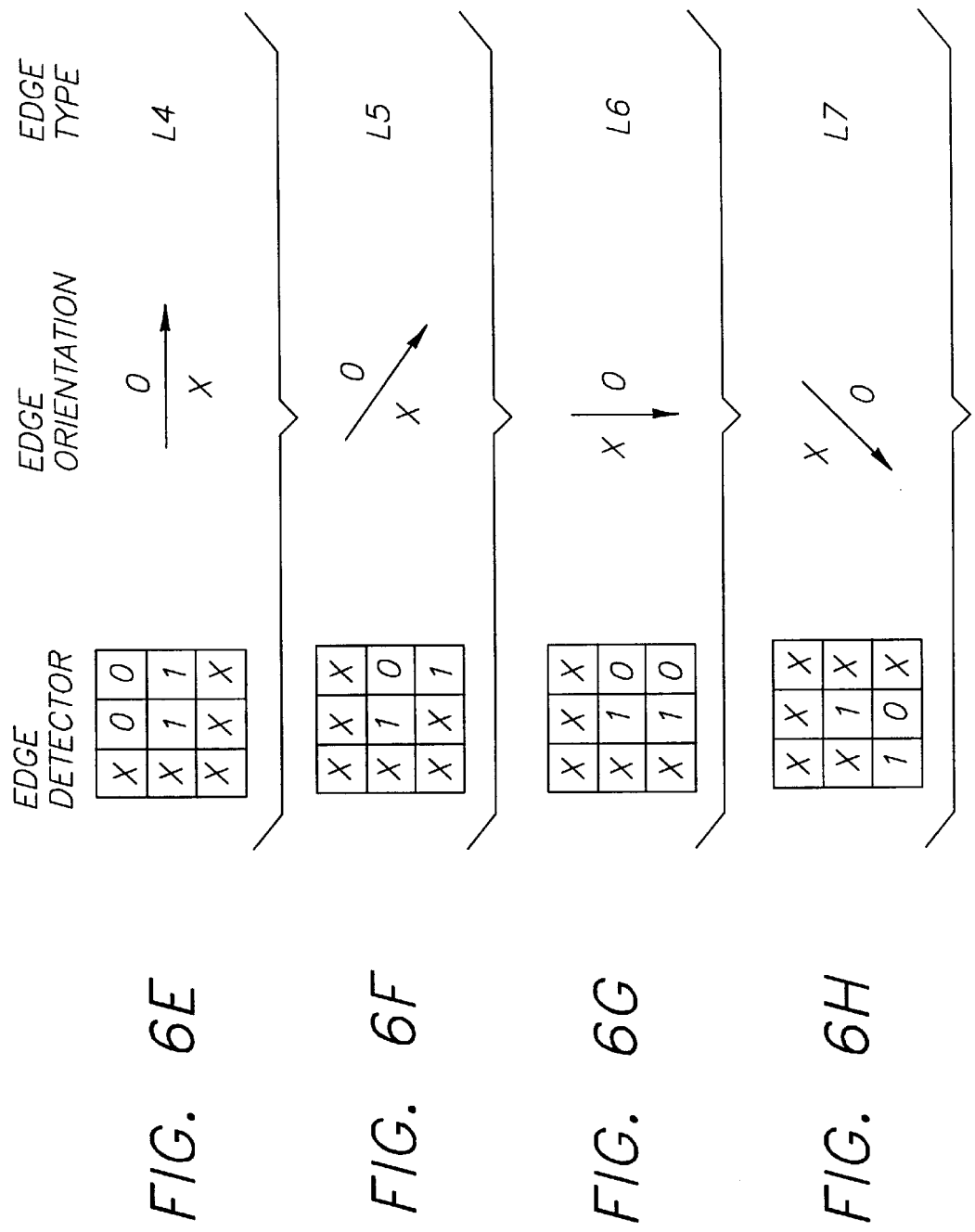

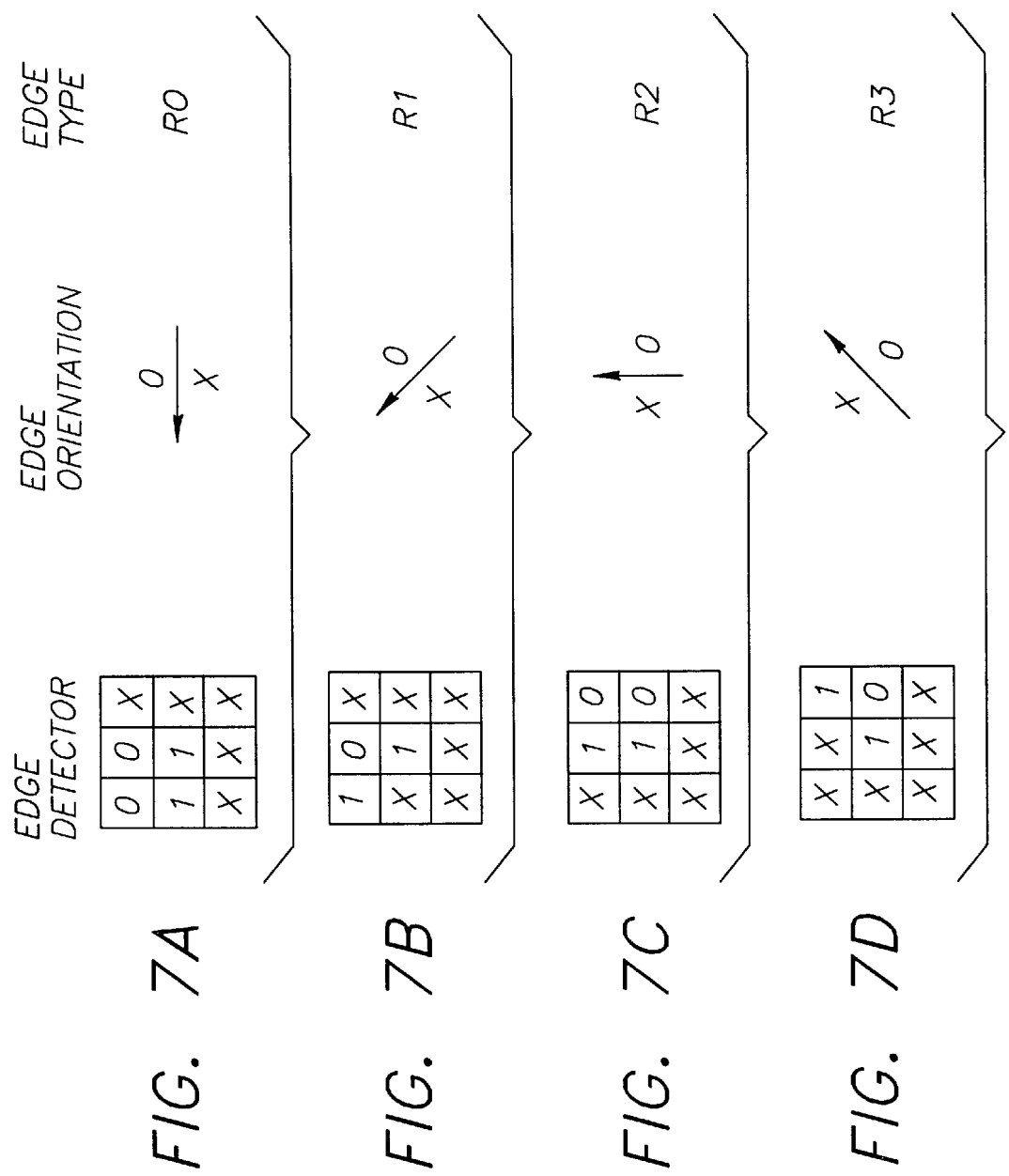

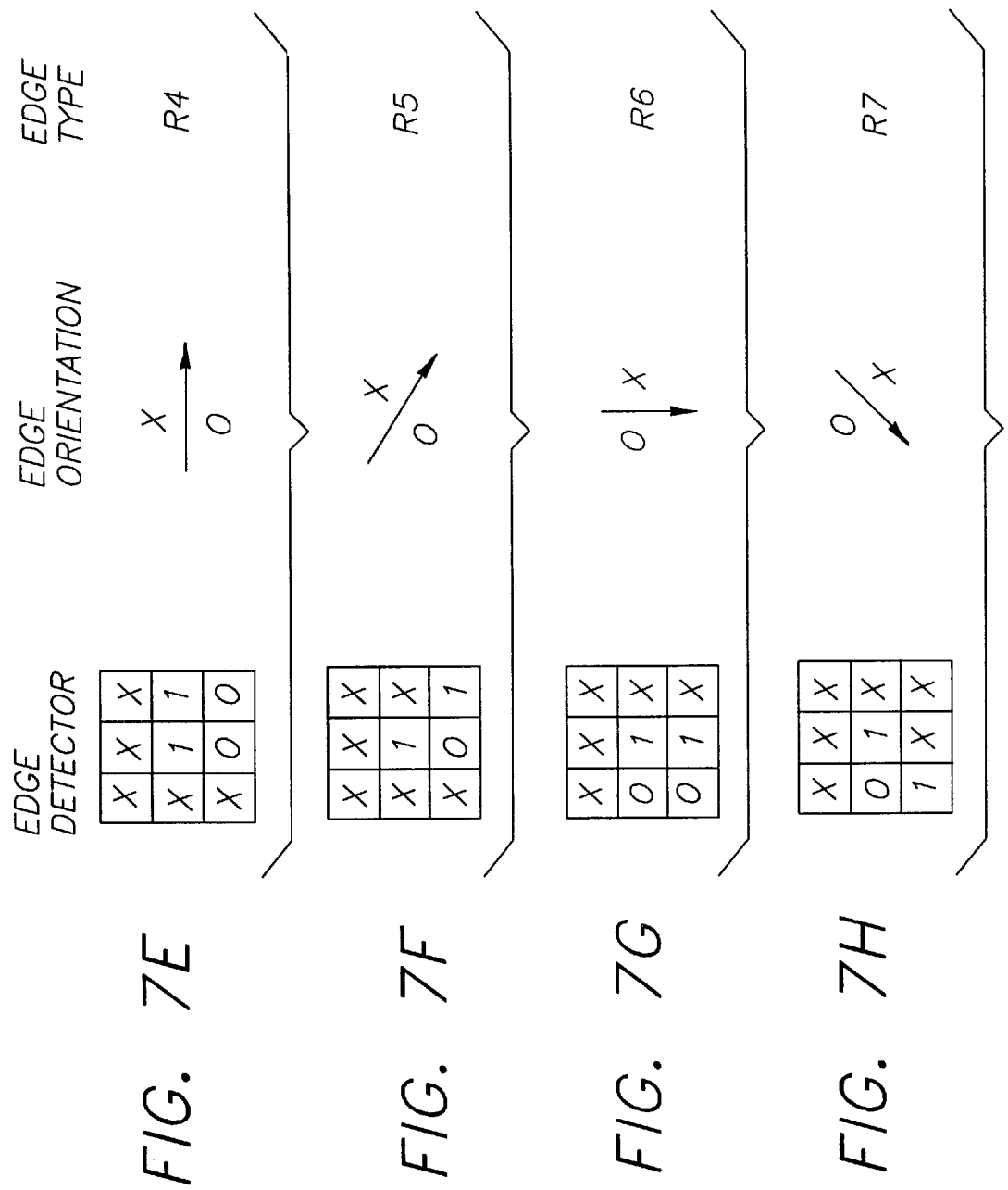

FIG. 8

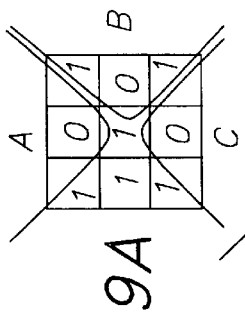

BUSINESS FORM IMAGE IDENTIFICATION USING PROJECTED PROFILES OF GRAPHICAL LINES AND TEXT STRING LINES

CROSS-REFERENCE TO RELATED APPLICATIONS

The present application is related to copending U.S. application Ser. No. 08/739,076, to be assigned, filed on Oct. 28, 1996, entitled, "A Look-Up-Table Technique for Conversion of a Bitmap Image Into Polygon Representation," by Yongchun Lee.

1. Field of the Invention

This invention relates generally to the field of business form identification methods and more particularly to a form identification method based on separating the form's graphical components from its text components prior to feature extraction.

2. Background of the Invention

Business form identification is a requirement for an automated form processing system. It provides the capability to automatically sort forms as to type. Once the business forms are sorted they can be passed to an optical character recognition system for extraction of the data entered on the form.

Within this document the use of the terms "identification" and "recognition" as applied to forms being recognized or identified is intended to mean the same thing. The performance of existing business form recognition methods, for example, as described in U.S. Pat. No. 4,949,392, by Barski, et al., entitled, "Document Recognition and Automatic Indexing for Optical Character Recognition," issued Aug. 14, 1990, and U.S. Pat. No. 5,293,429, by Pizano, et al., entitled, "System and Method for Automatically Classifying Heterogeneous Business Forms," issued Mar. 8, 1994, is highly sensitive to three unwanted image imperfections: (1) image skew, (2) background noise, and, (3) the existence of foreign objects such as signatures and the user's fill-in text. These unwanted imperfections occur in most scanned documents and their existence greatly degrades identification accuracy. The approach of existing form recognition methods typically includes two steps: (1) extracting lines of the form by doing horizontal and vertical line projection, and, (2) matching the lines of an unknown form with the lines from a stored library of lines relating to known forms. This is commonly called line template matching. It is obvious that an image that is skewed causes a normally vertical or horizontal line to generate extraction components along both the horizontal and the vertical line directions during the horizontal and vertical line extraction process. These additional components cause difficulty in correctly best matching the components of the skewed unknown form with the components of an unskewed known form. Also, the presence of foreign objects creates confusion in line extraction and results in a lower accuracy of recognition.

To resolve the deficiencies of these methods often requires additional digital image preprocessing such as skew angle detection and correction, and noise removal. These image processings involve intensive pixel operations.

The present method is a business form identification method that incorporates presents a contour polygon-based business form identification method that separates the form's graphical components from its text components prior to performing feature extraction and form recognition while minimizing the effects of the form being skewed during the scanning process. The separation process sharpens feature extraction and improves the accuracy of form recognition. In addition, the improved method is immune to contamination by background noise and foreign objects such as signatures and fill-in text.

SUMMARY OF THE INVENTION

The present invention is directed to overcoming one or more of the problems set forth above. Briefly summarized, according to one aspect of the present invention there is provided a method for constructing contour polygons from linear line segments that have been derived from a windowed raster scan of an image by the steps of:

a) detecting the binary values of the pixels within the scanning window as the window is scanned over the image;

b) positioning each of the binary values into an assigned and ordered position forming a string of binary values for each window scan with each string of binary values forming an integer number;

c) directing the formed integer number to a look-up-table that translates each integer number into one or more output template commands;

d) joining linear line segments into at least one contour polygon in response to the one or more output template commands;

e) examining each contour polygon to determine if it represents a text component or a graphic component;

f) grouping all text contour polygons and graphic contour polygons;

g) profiling each of the contour polygons in the text group and the graphics group;

h) accumulating the profiles for each of the groups; and i) comparing the accumulated profiles of step h against a Library of stored profiles of known forms so as to determine a best match thereby identifying the unknown form.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 is a sample of a business form to be identified;

FIGS. 5A, 5B, and 5C, are diagrams illustrating examples of; the generation of a lookup-table from a 3×3 bitmap pattern, a conversion of a 3×3 bitmap to an entry of the look-up-table, and the generation of commands using the look-up-table respectively;

FIGS. 6A–6H are definitions for eight left edge detectors wherein 0=white dot, 1=black dot and X=a don't care value;

FIGS. 7A–7H are definitions for eight right edge detectors wherein 0=white dot, 1=black dot and X=a don't care value;

FIG. 8 depicts, in 3×3 matrix form, the templates resulting from the edge combinations following the rules of Table 1;

FIGS. 9A–9D are examples of template commands generated by the rules of Table 1;

To facilitate understanding, identical reference numerals have been used in the drawings, where possible, to designate like elements.

DETAILED DESCRIPTION OF THE INVENTION

Figure 1:
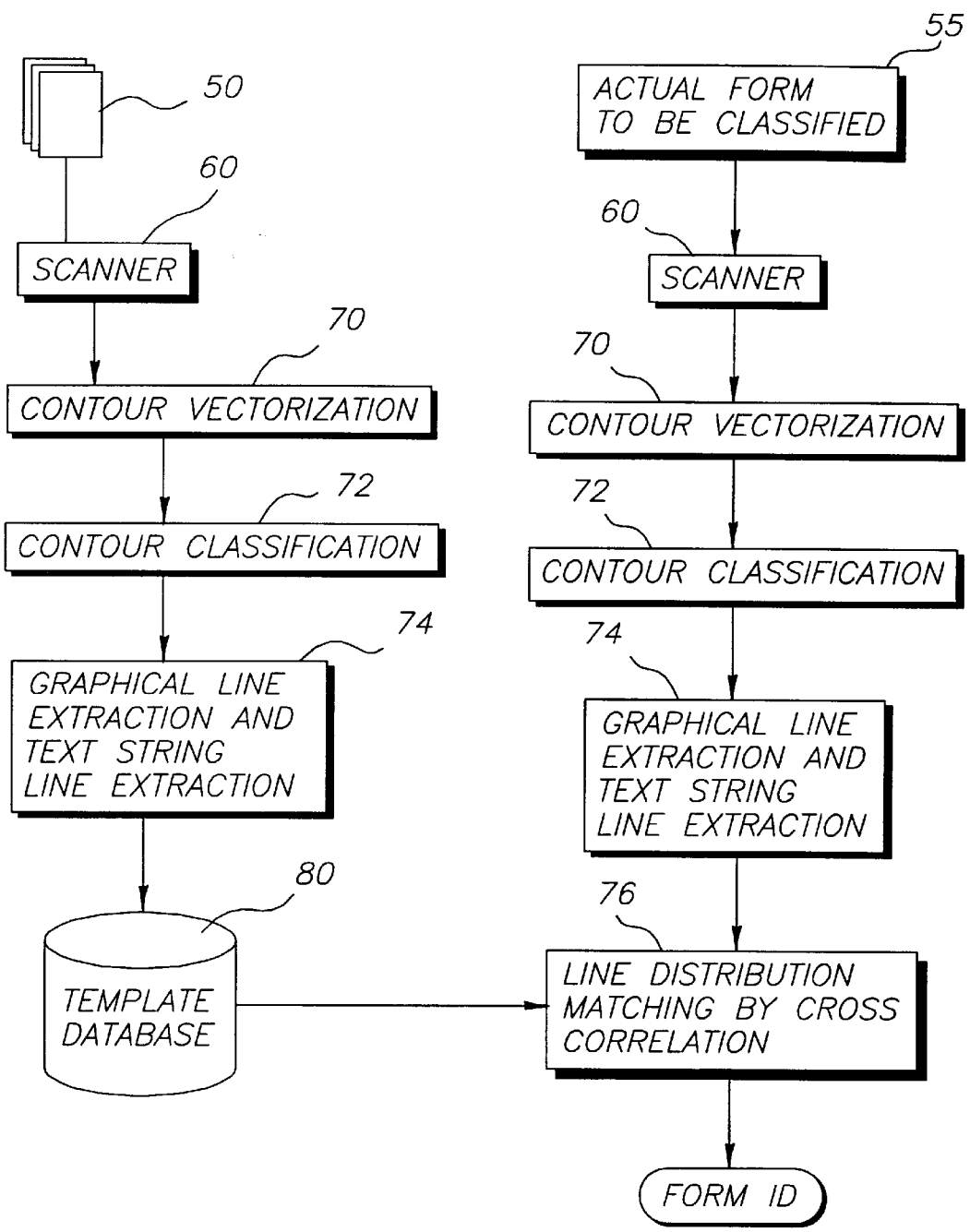
FIG. 1 is a block diagram of a system for automatically identifying business forms containing text and/or graphics.

Referencing FIG. 1, the major components and processing stages of a business form recognition system functions to scan a collection of different blank known forms 50 utilizing a scanner 60. Each scanned known form is assigned an identification number or symbol. Each scanned known form goes through a training contour vectorization process 70 to form contour polygons that represent the outer and the inner contours of images that exist on the business form. These images are, for example, the box surrounding an area that is to be filled in by the form user, a line that contains printed text or that has to be filled in by the user. The details of how the contour polygons are produced will be described later. The outer and inner contours are classified in a contour classifier 72 as being either inner or outer text or inner or outer graphic contours. The classified contours are forwarded to a line extraction function 74 which provides horizontal and vertical line projected distributions of text and graphics components. The projected distributions are stored in a template database 80 associated with the identification number of its original form.

The identification process takes an unknown form 55 and scans the form in scanner 60 with the scanned data being processed in a like manner as previously described for function blocks 70, 72, and 74. At this point in the process the projected line distributions from the text and graphics line extraction function 74 are compared against the projected line distributions stored in the template database 80 using a comparison algorithm such as a cross-correlation function 76. Assuming that the unknown form represents one of the known forms that was originally processed with the results stored in the database 80, an identification will be made and the identification number (ID) of the form will be outputted by the system.

Figure 2:
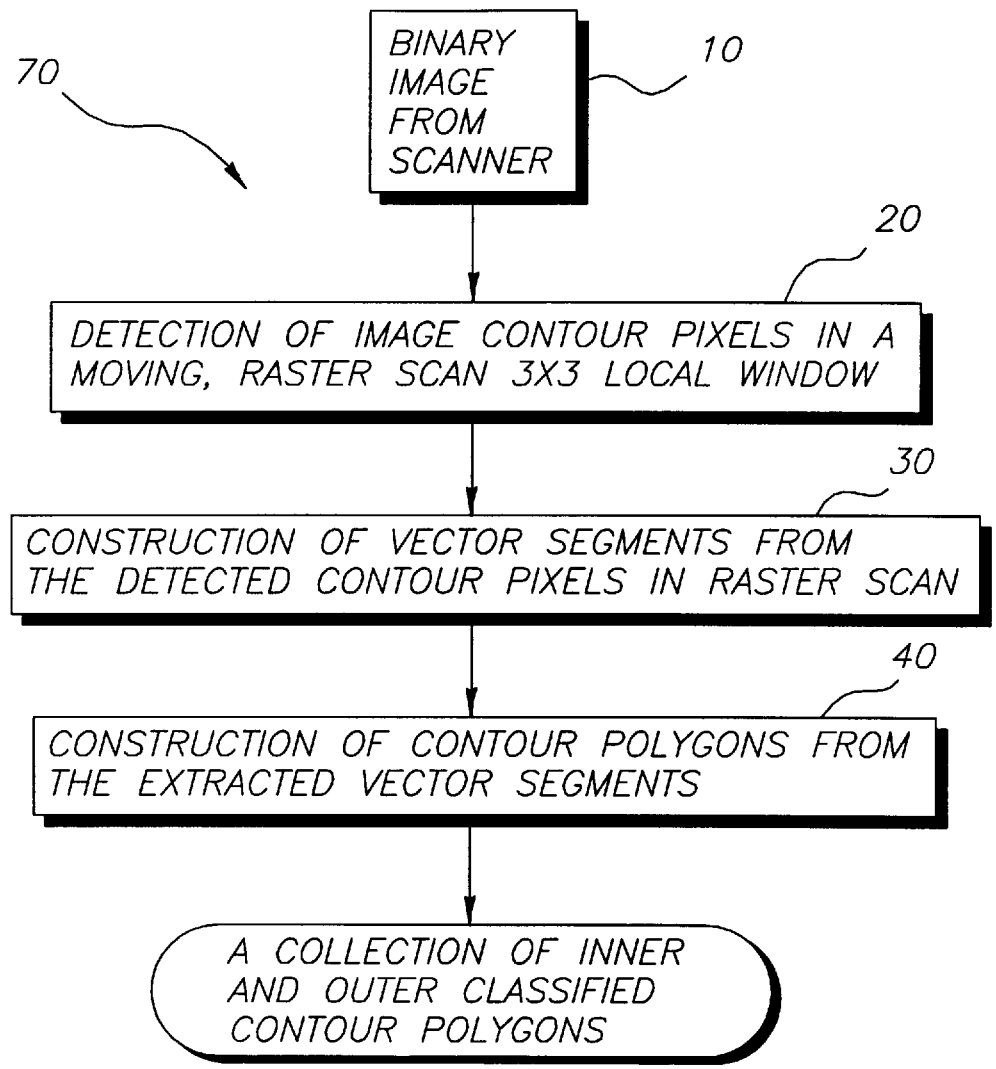
FIG. 2 is a high level flow diagram of the preferred method of the present invention.

Referring now to FIG. 2, wherein the contour vectorization process 70 is described in more detail, a known or unknown business form is scanned by the scanner 60 and converted to a binary image 10. The binary image 10 is then processed to detect contour pixels, and to assign pixel values according to established conversion values. The assignment function, represented by the block labeled 20, is implemented using a 3×3 pixel window that is advanced over the binary image one pixel column at a time. The pixels that represent the contours of the image (the contour of a form) are converted to vectors, represented by block 30. The vector segments are forwarded as the input to box 40. Box 40 represents the function of properly connecting vectors, end-to-end, to form one or more contour polygons representing the contours of the scanned image. The output from box 40 results in the contours being classified as being inner or outer by the direction of their component vectors, counterclockwise being defined as an inner contour, and clockwise being defined as an outer contour. This is more clearly visualized by comparing the unknown business form 55 of FIG. 3 with the same form represented with inner and outer contour polygons in FIG. 14. For simplicity, FIG. 15 does not illustrate the text components of the scanned form.

Figure 15:
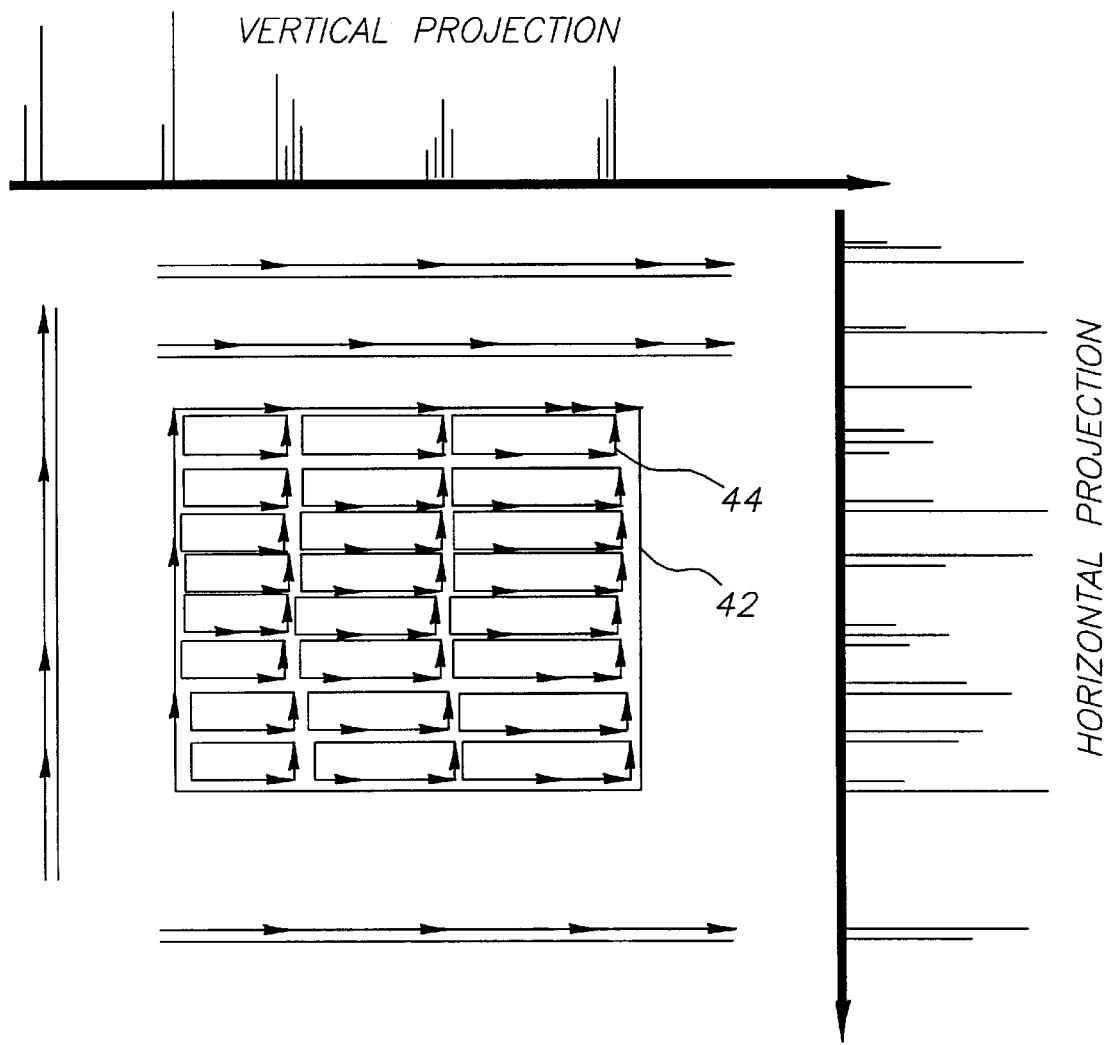
FIG. 15 illustrates the process for deriving graphical line distributions by measuring the projections of horizontal and vertical line segments of the graphic contours of a business form.

In summary then, the aforementioned operation is depicted in FIG. 15 wherein, contour vectorization converts a binary image ID into a collection of simple polygons 42 and 44 which are useful in or with a form type document recognition system or technique such as skew detection, line detection, or image registration techniques. The formation of these contour polygons is generically a two step process of contour tracing and piecewise linear approximating the extracted contour pixels. Each polygon is associated with either an outer contour or an inner contour. Note that the outer contour 42 is traced in a clockwise direction and that the inner contour 44 is traced in a counter-clockwise direction.

Figure 4:
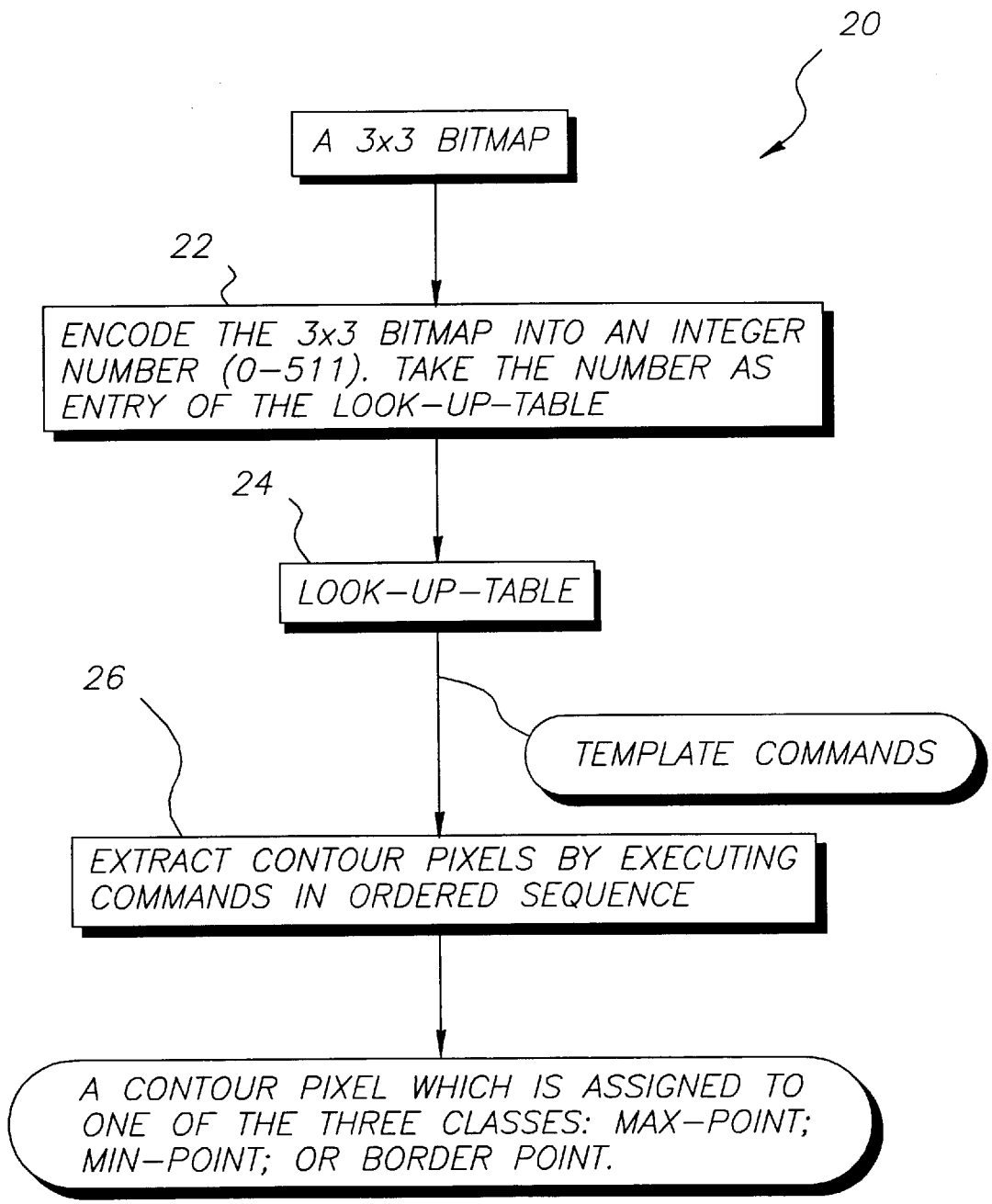
FIG. 4 is a flow diagram of a contour pixel detection method used in the preferred method of the invention.

Referring back to FIG. 4 wherein is illustrated, in more detail, the functions performed by contour pixel detection block 20 of FIG. 2. The preferred methodology for detecting a contour pixel inputs a 3×3 bitmap taken from a scan of the original image (form) with the output of the scan function being the binary image 10 discussed previously. The 3×3 bitmap represents the nine pixel values that lie within a 3×3 window at one instant in time as the window is scanned over an image (form). As represented by the function box 22, each 3×3 bitmap is encoded into an integer number having values that range from 0–511. The resulting integer numbers are used as entries into a look-up-table 24. The look-up-table technique is preferred in that it is computationally efficient. The look-up-table outputs "template commands," the details of which will be described later, that are inputted to a function box 26 which box represents the function of extracting contour pixels by executing template commands in an ordered sequence. Each of the outputted contour pixels is assigned to one of three classes: a max-point, a min-point, or a border point.

The details of the invention with respect to the formation of the output template commands from the 3×3 bit map will now be addressed in the discussion of FIGS. 5A–5C. In FIG. 5A, the 3×3 window is shown generically with its nine cells labeled A through I. As can be appreciated, in a binary system a bit within a cell can take on a value of either a 1 or a 0. This is illustrated with the specific example presented in FIG. 5B. The bits A through I are arranged in a specific order so as to form a 9-bit integer. As previously discussed in the preferred embodiment of the invention, the 9-bit integers range in value between 0 and 511. The specific bit pattern selected for the FIG. 5B example resulted in the integer 437 being formed. This integer is then used as an entry number to address the look-up-table 24, as shown in FIG. 5C, to output the associated template commands, in this case template commands 5, 2. Additional details on the template commands will be provided later in this description of the invention.

Referring now to FIGS. 6A through 6H, wherein the definitions used for eight left edge detectors is set forth defining edge types L0 through L7. In these figures a 0 represents a white dot, a 1 represents a black dot, and an X represents a dot that can be either white or black, but the system doesn't care. Examining the 3×3 matrix of FIG. 6A it is noted that two adjacent 1 bits are horizontal and parallel to two adjacent 0 bits. The edge orientation, represented by this bit pattern, is defined as being both horizontal and extending to the left. For ease of understanding, the edge orientations are represented by an arrow with the position of the 0 bit (white dots) controlling the directions of the edge orientation arrows. Note for edge type L0 that edge type L4 is the same, but flipped in that the arrow is horizontal, but in the opposite direction and that the 0 bits in the FIG. 6A window are below the 1's while in The FIG. 6E window the 0 bits are above the 1's. Note the same holds true for the vertical edge types L2 and L6 and for the 45 degree edge types L1, L5, L3, and L7.

FIGS. 7A through 7H set forth the definitions for eight right edge detectors representing edge types R0 through R7.

The following table, Table 1, sets forth the template commands that are used for each edge type combination and assigns to each combination a rule number. Conversely stated, each rule number identifies a specific type of combination.

TABLE 1

| Rule | Basic Edge Type Combination | Corresponding Template Commands |
|---|---|---|
| #1 | Li or Ri (i = 0,1,2,3) | i (add a chain code command) |
| #2 | Li and Ri (i = 0,1,2,3) | i,i (add two identical chain code commands) |
| #3 | Li and Rj (i < 4, j < 4) | i,j,6 (commands to remove an outer contour min-point) |
| #4 | Li and Pj (i = 0, j = 3) | 0,3,6 (commands to remove an inner contour min-point) |
| #5 | Li and Rj (i = 1, j = 3) | 1,3,6 (commands to remove an inner contour min-point) |
| #6 | Li and Rj (i > 4, j > 4, j > i) | 4 (command to add a new outer contour max-point) |
| #7 | Li and Rj (i = 7, j = 5) | 5 (command to add a new inner contour max-point) |
| #8 | Li and Rj (i = 7, j = 4) | 5 (command to add a new inner contour max-point) |

Figure 8:
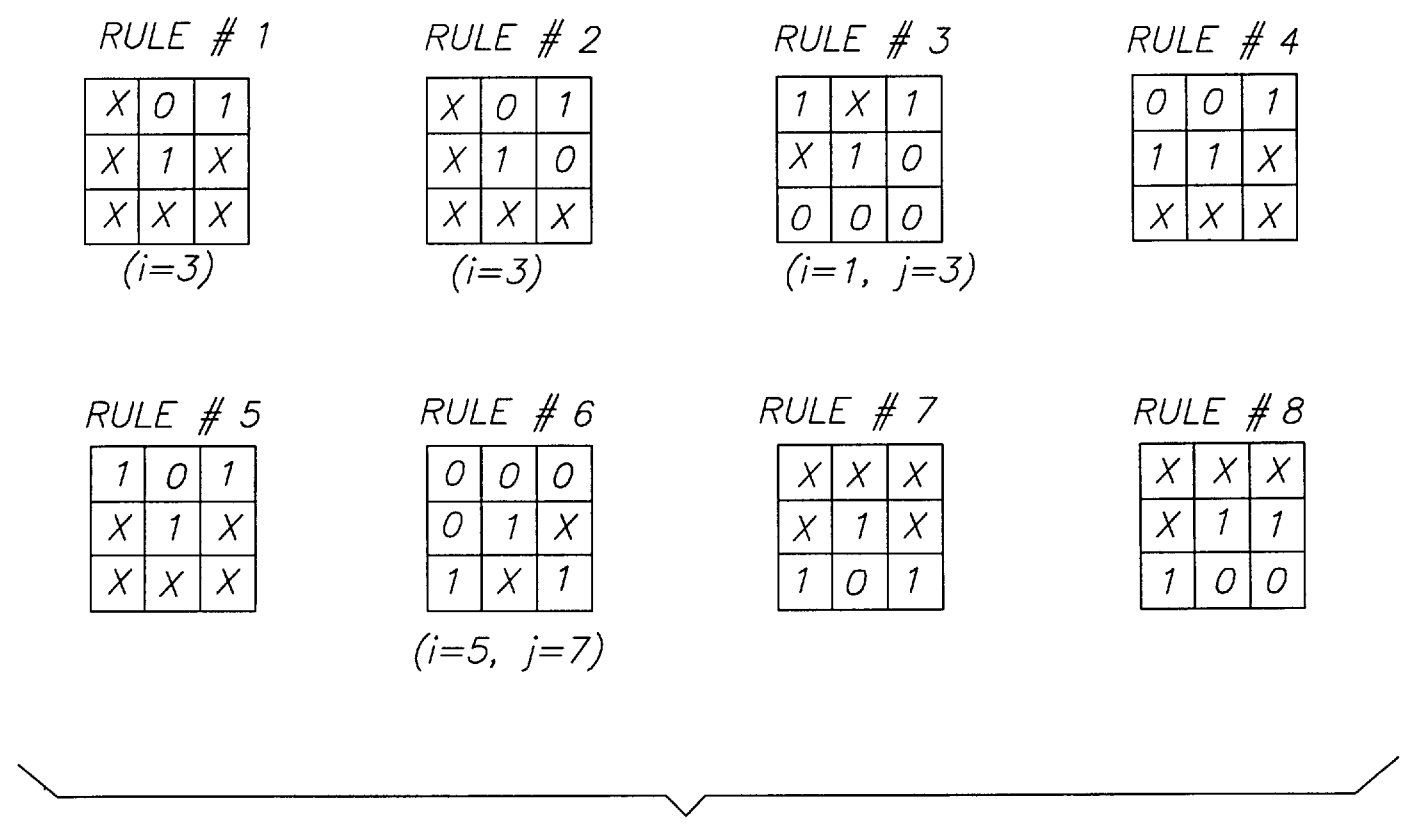

FIG. 8 illustrates the templates that result from the edge combinations according to the rules of Table 1.

Table 2 illustrates the relationship between a particular 3×3 bitmap and its associated entry number. The entry number being generated according to the procedure previously illustrated in FIG. 5B. Table 2 also shows the template commands that are outputted from the look-up-table 24 when the corresponding entry number is applied as an address to the look-up-table. A number of bitmap patterns can have no template command assigned while others may have more than one. For example, referring to Table 2, if the center cell of the 3×3 matrix is 1 and at least one of the surrounding cells is a zero, there is a template command otherwise, no command is assigned.

TABLE 2

| 3 × 3 Bitmap Pattern | Entry Number | Template Command |
|---|---|---|
| 000 000 000 | 0 | none |
| 000 000 001 | 1 | none |
| . . . | . | . |
| 000 010 101 | 21 | 4,5 |
| . . . | . | . |
| 000 010 111 | 23 | 4 |
| . . . | . | . |
| 101 110 000 | 368 | 0,1,3,6,3,6 |
| . . . | . | . |
| 110 110 101 | 437 | 5,2 |
| . . . | . | . |
| 111 111 111 | 511 | none |

The templates of FIGS. 9A–9D represent four bit patterns that translate into the table entry numbers, 373, 124, 151, and 368, using the methodology of bit assignment taught in FIGS. 5A and 5B. Each template pattern is then compared against the eight rules of combination for left and right edge detectors, illustrated in FIG. 8, to determine which template command(s) apply to the template pattern.

| | Definitions of Template Commands |
|---|---|
| 0 | add chain code 0 |
| 1 | add chain code 1 |
| 2 | add chain code 2 |
| 3 | add chain code 3 |
| 4 | initiate a new outer maximum contour point |
| 5 | initiate a new inner maximum contour point |
| 6 | merge two chain codes |

Figure 10A:
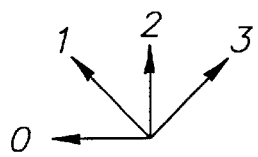
FIGS. 10A and 10B illustrate a directional chain code graph and an example of a conversion of chain codes into a representative polygon vectors, respectively.

For example, the template of FIG. 9A includes three contour segments A, B, and C, that are represented by rule numbers 2, 5, and 7. Following these represented rules will result in template commands 1, 3, 6, 5 and 3. The template command 1 is related to contour segment A by noting that the center cell value 1 is accompanied by a 1 value in left uppermost cell. Comparing that relationship to the definition of chain code direction, illustrated by arrows in FIG. 10A, results in command 1. Likewise the 1 bits in the center cell and in the right uppermost cell results in command 3. An examination of the 1 pattern in the matrix of FIG. 9A results in the determination that the 1's in the upper two rows of the matrix represent a merging of the 1 and 3 chain codes. Such a merging results in the command 6. Examination of the third row of cell values indicates a new inner maximum contour point corresponding to contour segment C, which results in command 5. Examination of the right column of cell values results in the identification of contour segment B. Starting from the center cell value of 1 it is deduced that the associated chain code is a 3.

Figure 10B:
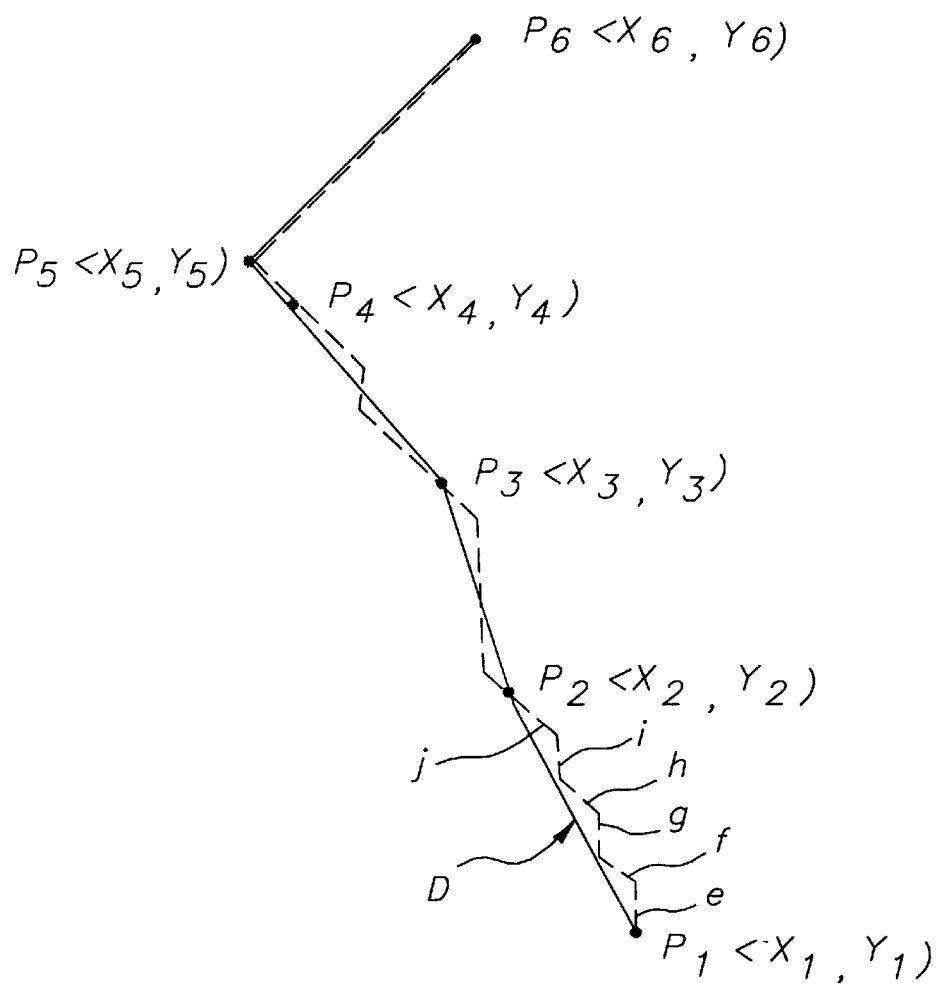

Each form or image that has been scanned has a number of its pixels forming edges and/or lines that are assigned to an edge type (L0-L7; R0-R7). This identifier is related to the direction of a vector segment. Following a rule set, each vector segment is joined to another vector segment either in a clockwise direction or in a counterclockwise direction, dependent on whether the vector segments make up the inner edge of an object or the outer edge of the object. An example of a chain code string represented by joined vector segments is illustrated in FIG. 10B. The represented chain code string is 212121 122221 112111211 1 33333. Comparing the chain code to the vectors illustrated in FIG. 10B and referencing the direction arrows of FIG. 10A, it is seen that the first digit 2 of the chain code results in a vertical vector element e joined to a vector element f representing the second digit 1 of the chain code going in the 45 degree direction indicated by the vector 1 of FIG. 10A. The same explanation applies to the vector elements g through j. At this point a line segment D is formed by a straight line between the two end points of the connected vector elements.

When connected the vector segments form contour polygons of the objects. These contour polygons are further processed to generate feature data that is matched with previously stored sets of feature data derived from known forms to obtain a best match.

Figure 11:
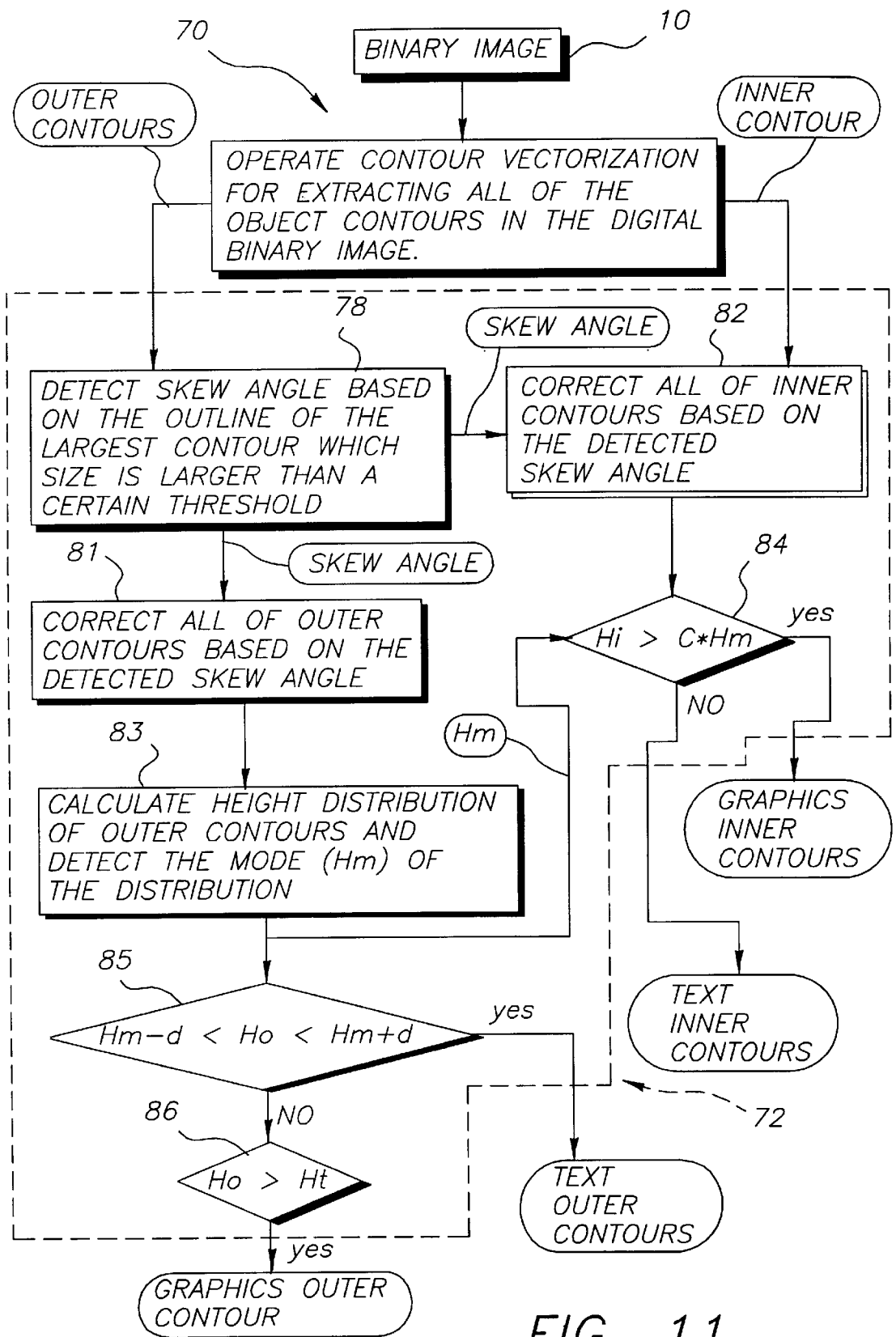
FIG. 11 is a flow chart illustrating the process of contour classification by separating the form's graphic components from its text components.

Referring back to FIG. 1, the process of contour classification for separating graphics components from text components occurs in the block labeled 72. The details of block 72 are set forth in FIG. 11. Generally speaking, polygon classification is the process of separating text polygons from graphical polygons. The classification is performed with the following steps: First evaluate the average size of characters by histogramming the height of outer polygons. The mode of the histogram then indicates the size of the majority of characters. Any inner polygon whose height is smaller than the mode is classified as the inner contour of a character. An inner contour whose height is larger than the mode is assigned as an inner contour of graphics. The outer polygons whose size is larger than a certain threshold is also classified as graphics. More specifically, with this process the extracted outer contours are directed to function block 78 wherein the skew angle, if any, of the outline of the largest contour, greater than an established threshold value, is determined.

Figure 12:
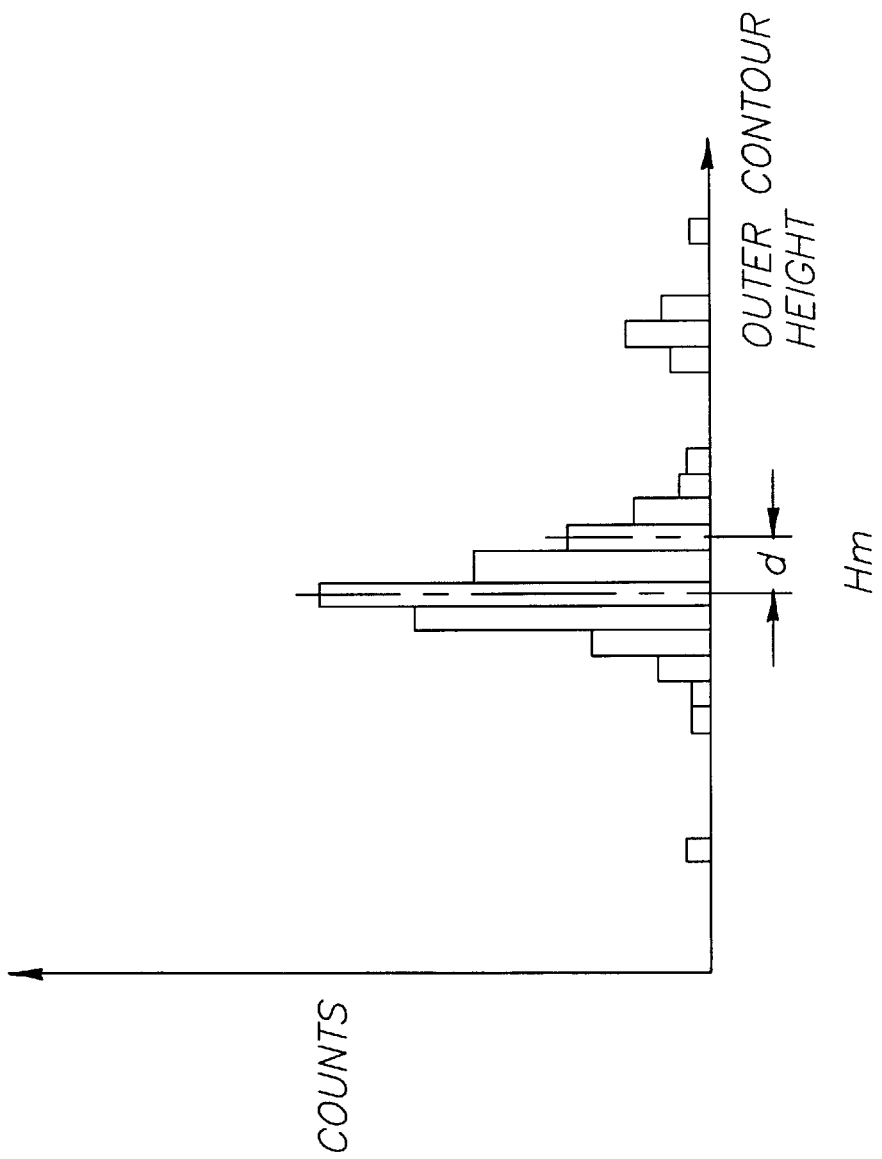
FIG. 12 is a bar chart illustrating the distribution of outer contour heights.

Details of how the skew angle is determined will be described in conjunction with the description of FIGS. 13 and 14. The determined skew angle outputted from function block 78, is used to correct all outer contour values inputted to block 81 and all inner contours inputted to block 82. The corrected outer contours from block 81 are directed to block 83 wherein their height distribution and the value Hm, corresponding to the average of the maximums, is determined. FIG. 12 illustrates in histogram form an example of the distribution of outer contour heights and the values Hm and d. Referring back to FIG. 11, in decision block 84, the value Hm is provided with a constant C and is compared against the high value Hi for each inner contour derived from the binary image 10. If the value of Hi is greater than the product CHm, the inner contours are inner graphic contours and if they are not, then the inner contours are text contours. The test for text outer contours is performed in block 85 and the test for graphic outer contours is performed in block 86. In block 85 a determined value, Ho, is compared against the value Hm+and-a quantity d, and if the answer is no, then Ho is tested against a determined threshold Ht. If Ho is greater than Ht, then the outer contour represents an outer graphic contour. If Ho is not greater than the threshold Ht, the outcome is not used for any further processing.

Figure 13:
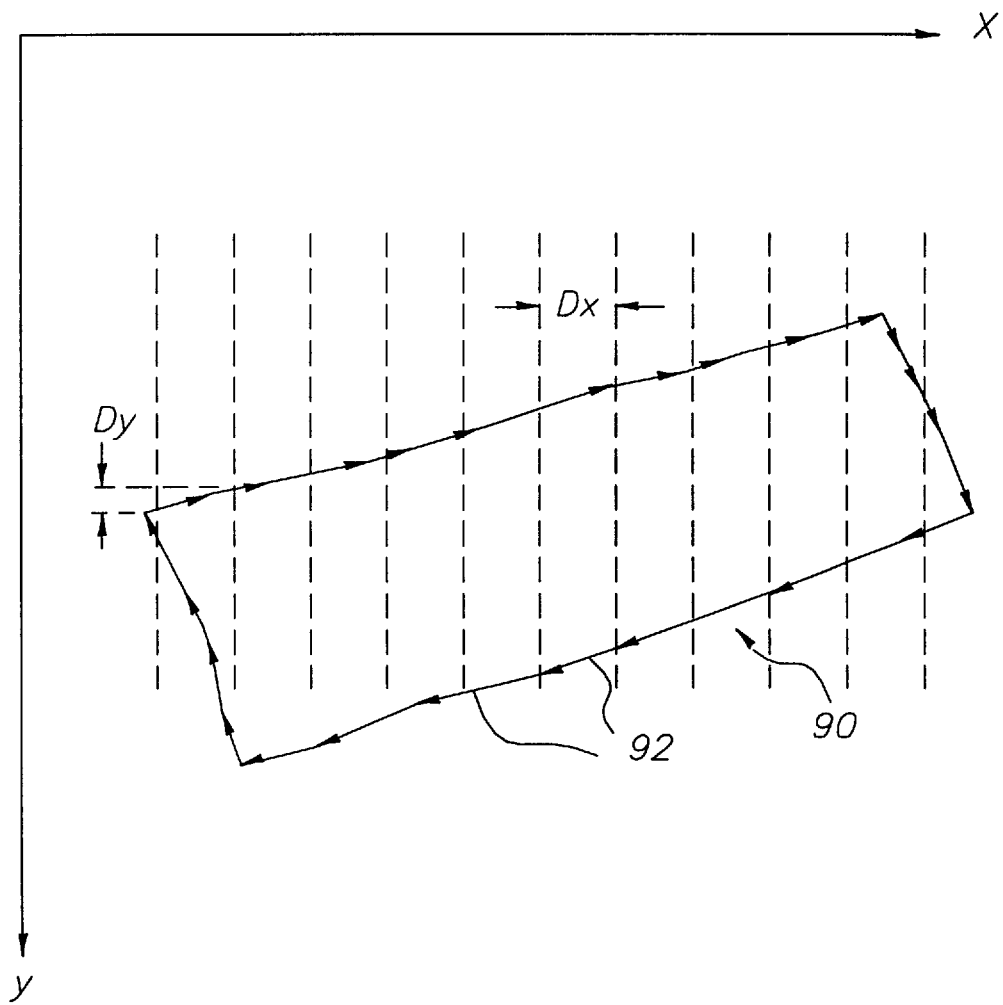
FIG. 13 is a diagram useful in understanding the process of estimating the skew angle of a business form.
Figure 14:
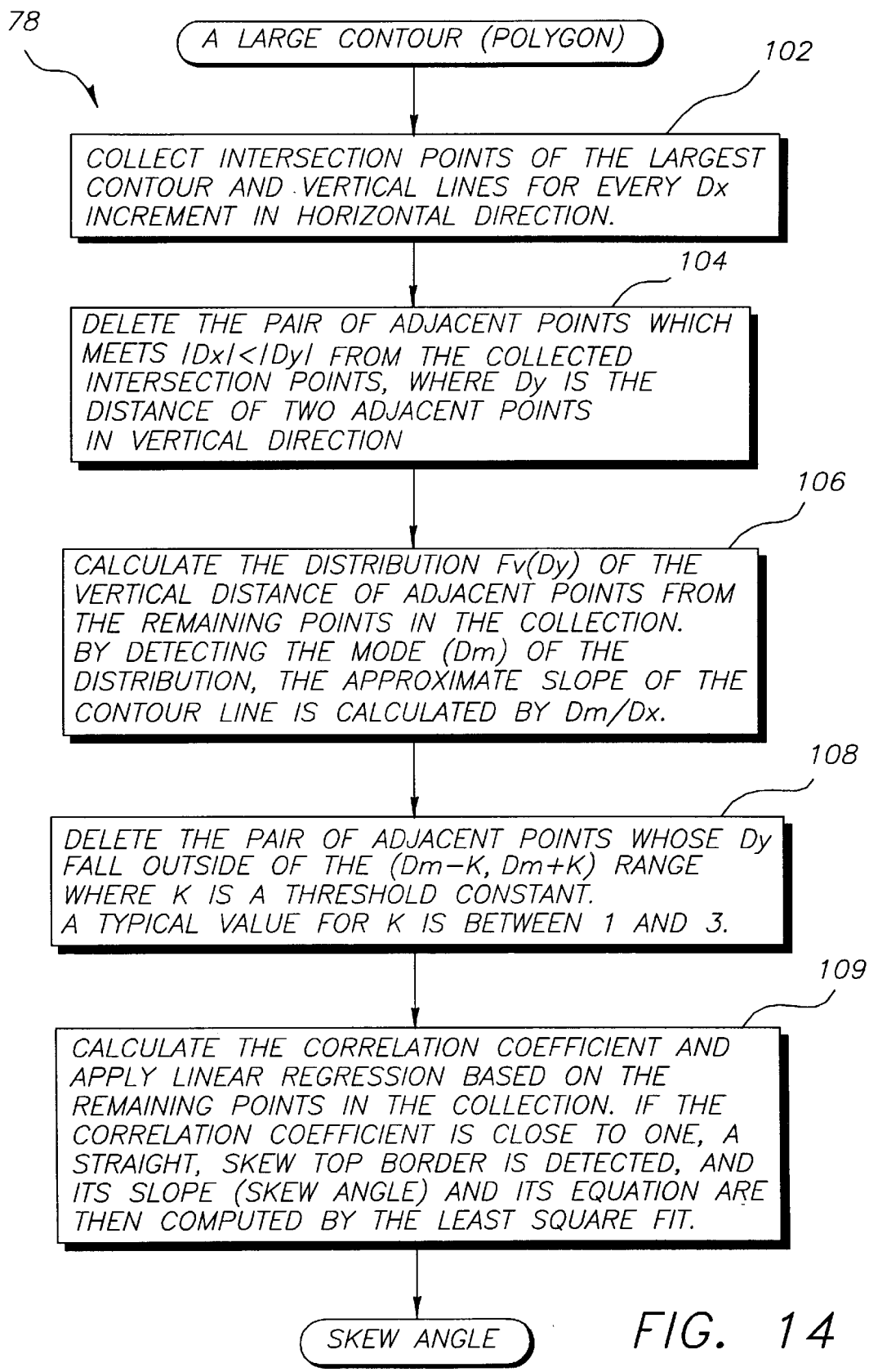
FIG. 14 is a flow diagram illustrating the process for estimating the skew angle of a business form.

Referring now to FIGS. 13 and 14, a sample of a largest outer polygon contour 90 is shown formed of a plurality of connected vectors 92 that outline the shape of a rectangle that is skewed at an unknown skew angle. The vertical displacement component for each vector between equally spaced horizontal increments Dx is denoted as the value Dy. In block 102 of FIG. 14, the intersect points of the largest contour with the vertical lines representing the equally spaced horizontal increments Dx are collected. In block 104 the pair of adjacent points that meet the requirement that their length in the vertical direction is greater than their length in the horizontal direction is deleted from the collection. Looking at FIG. 13 it is easily seen that the end lines of the outer rectangular contour meet the requirement of block 104 and they are therefore discarded from further consideration. In Block 106 the distribution of the vertical distances of adjacent points is calculated. The mode of the distribution is labeled Dm with the approximate slope of the contour being determined by calculating the value of Dm/Dx. To further clean the slope determination, points falling outside of the range of Dm +/− K values, given in Block 108, are deleted. Effectively then, blocks 102 through 108 determine the slope of the outer contour while removing variations in the contour that are determined by noise and other phenomena that cause variations in the slope of the individual vectors from their true value. With the slope of the largest outer contour determined, the result is directed to block 109 wherein the skew angle of the largest outer contour is calculated. The calculated skew angle of the largest polygon contour is taken as the skew angle of the entire image (the business form).

The process of determining the skew angle for the largest outer contour, and in turn the form on which the contour is printed, is set forth below in mathematical detail. A series of dotted vertical scan lines as shown in FIG. 13 are drawn to intersect the polygon with a certain distance. The points of intersection between these scan lines and the top line of the polygon are $(x_i, y_i)$ where i=1, . . . ,N, N is the number of intersection points. The linear correlation of these points is evaluated using a correlation coefficient. The correlation $$r_{xy} = \frac{S_{xy}}{S_x S_y},$$

$$S_{xy} = \sum_{i=0}^{N} (x_i - \bar{x})(y_i - \bar{y}) \text{ and}$$

$$S_x = \sqrt{\sum_{i=1}^{N} (x_i - \bar{x})^2}, S_y = \sqrt{\sum_{i=1}^{N} (y_i - \bar{y})^2}$$

The value of the correlation coefficient is between zero and one, according to the definition. If the correlation coefficient is close to one, it indicates that these points are collinear, and the linear least square fit is applied to these points. The rotating angle $\theta_S$ is read from the slope ($\theta_S$=b) of the fitted straight line, y=a+bx, where $$b = \frac{\sum_{i=1}^{N} x_i y_i - N\overline{xy}}{\sum_{i=1}^{N} x_i^2 - N\overline{x}^2}, \overline{x} = \sum_{i=1}^{N} x_i, \overline{y} = \sum_{i=1}^{N} y_i.$$

The rotating angle of the polygon is taken as the skew angle of the scanned business form image.

The skew angle correction of polygons mathematically rotates the polygon to a horizontal position by recalculating the coordinates of polygon vertices based on the rotating angle. The process firstly calculates the coefficiencies of the 2×2 rotation matrix, $$\begin{bmatrix} \cos(\theta_S) & \sin(\theta_S) \\ -\sin(\theta_S) & \cos(\theta_S) \end{bmatrix}.$$

The rotation of polygons is then performed by multiplying the Cartesian coordinate (x,y) of each vertex of all of the contour polygons with the rotation matrix, $$\begin{bmatrix} x_{new} \\ y_{new} \end{bmatrix} = \begin{bmatrix} \cos(\theta_S) & \sin(\theta_S) \\ -\sin(\theta_S) & \cos(\theta_S) \end{bmatrix} \begin{bmatrix} x_{old} \\ y_{old} \end{bmatrix},$$

where ($x_{new}$,$y_{new}$) and ($x_{new}$,$y_{old}$) are the coordinates of polygon vertices after and before rotation, respectively.

There are five data distributions extracted as features of an image for form recognition from the skew corrected polygons. The first two data distributions ($F_1$ and $F_2$) are horizontal and vertical graphical line profiles extracted by projecting horizontal vectors of all graphical polygons into a vertical plane and by projecting vertical vectors of all graphical polygons into a horizontal plane, respectively. This is detailed in FIG. 15. The two line profiles reflect the graphical distribution feature of the document image.

Figure 16:
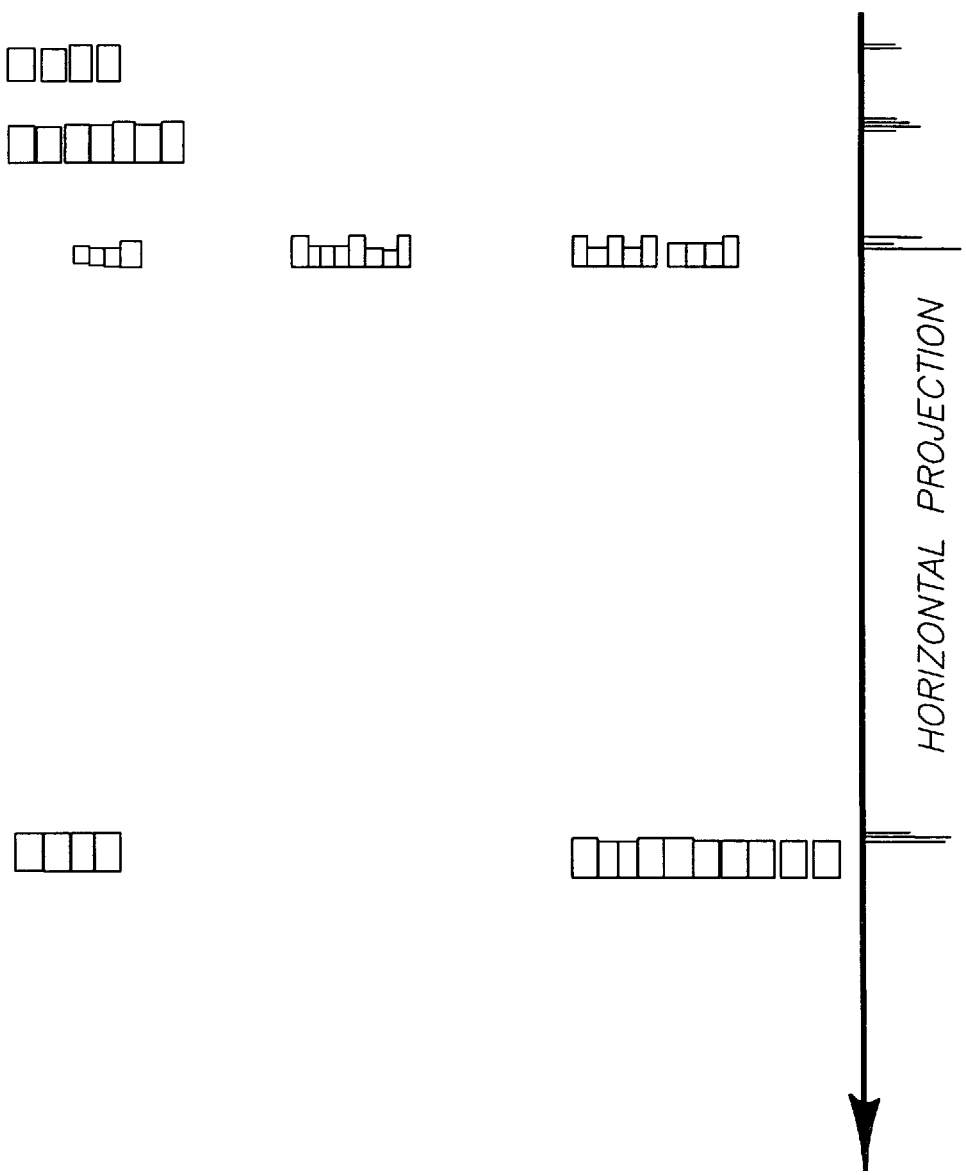
FIG. 16 illustrates the measured text string line distribution obtained by projecting the top border of a character bounding-box in a horizontal direction.
Figure 17:
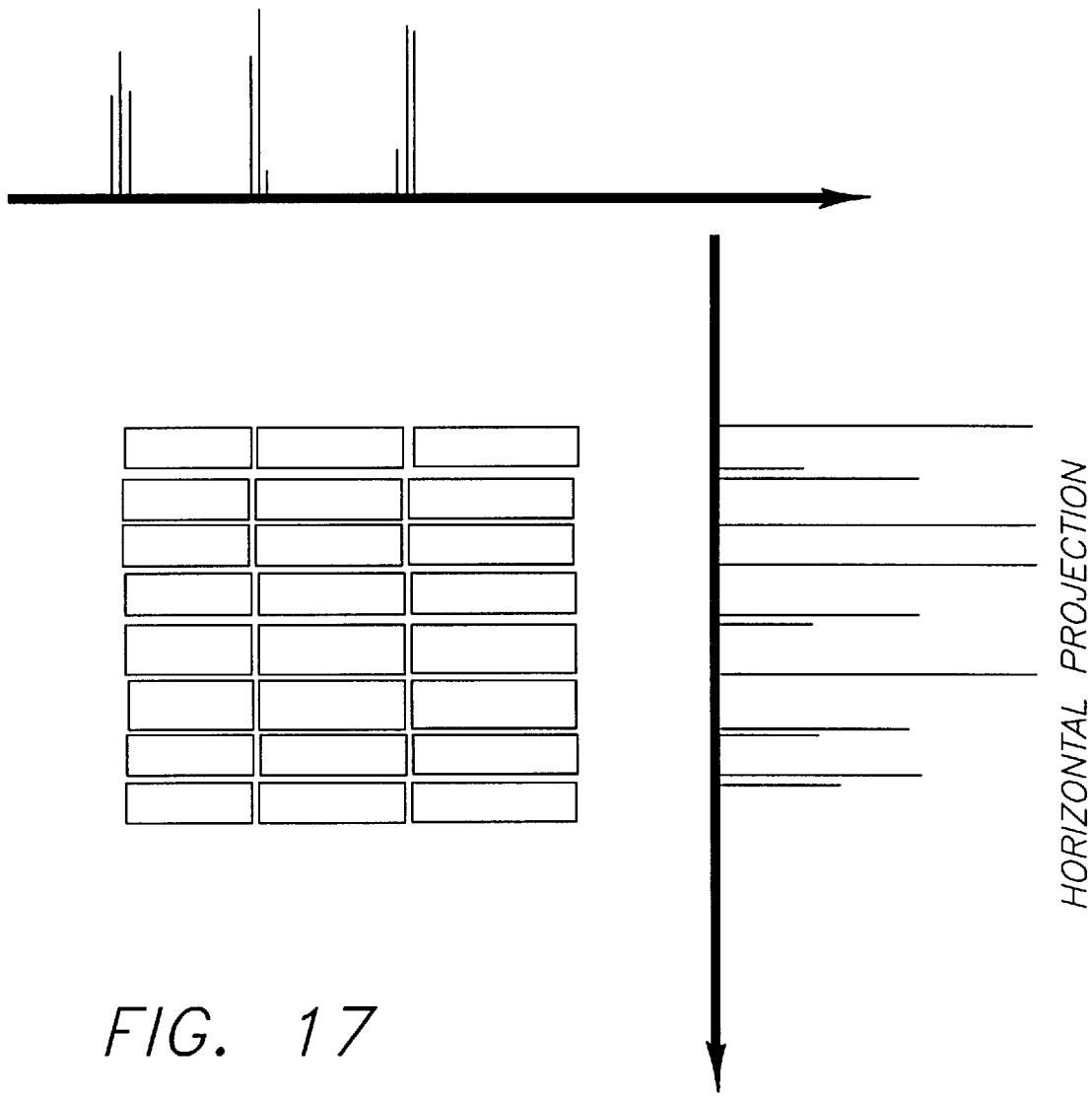
FIG. 17 illustrates a graphical line distribution measured by projecting bounding-box edges of graphical inner contours.

FIG. 16 illustrates a third data distribution ($F_3$) that is the text string distribution profile extracted by projecting the bounding width of text polygons into a vertical plane. FIG. 17 illustrates the last two data distributions ($F_4$ and $F_5$) which are gathered from the bounding-box edge projections of graphical inner contour polygons in both the horizontal and vertical planes. The two projection profiles feature the structure of graphical frames in an image.

Prior to form recognition, a database which stores the features of all forms of interest and their identifications for use in recognition process is generated. The database is generated using the form identification training process. The process, including contour vectorization, polygon classification and feature extraction as mentioned above, collects the forms of interest and goes through the contour vectorization, polygon classification, and feature extraction. The process results in a database which stores sets of five data distributions ($F_1$-$F_5$) and their associated identification number.

In the recognition process, a business form is scanned and processed. Each of its five data distribution points are matched with a corresponding set of five data distributions in the database and the best match is considered its identification.

The matching process incorporates a cross correlation method that attempts the best registration of the current data distribution function against each distribution function stored in the database. Each registration process outputs a displacement and a score which indicates the degree of the cross correlation from the registration. The maximum value of a score provides the clue of the best match and the associated displacement gives the offset of the two images.

An example of cross correlation that may be used with the preferred embodiment of the invention mathematically lets $C_1(x)$ and $C_2(x)$ be the two data distribution functions. The normalized cross correlation function (NCC(d)) is defined as $$NCC(d) = \frac{C_{12}(d)}{(C_{11}(0)C_{22}(0))},$$

where $$C_{12}(d) = \sum_x C_1(x+d)C_2(x), C_{11}(0) = \sum_x C_1(x)C_1(x),$$

$$C_{22}(0) = \sum_x C_2(x)C_2(x), x = 0, \ldots, M, d = -M, \ldots, 0, \ldots, M-1,$$

M is the size of data array. It is decided that a displacement (d) occurs if the displacement makes a normalized cross correlation function between the $C_1(x)$ and $C_2(x)$ maximum; i.e. NCC(D)=max NCC(d). The value of NCC(D) is in the range of between 0 and 1. The low value of NCC(D) indicates low correlation of the two data distribution. On the other hand, a high value of NCC(D) means that the two data distributions are strongly correlated. The value of NCC(D) =1 implies that the two data distributions are identical.

Assume that the database stores L sets of data features which represent L number of forms. Each set of data features consists of five data distributions denoted by $F_{ij}$, where i=1, ...,L and j=1,2,3,4,5. Let the feature set of the targeted form be denoted by $G_j$, where j=1,2,3,4,5. The normalized cross correlation of the targeted form and the $i^{th}$ form of the database at the $j^{th}$ feature is expressed as $$NCC_{ij}(d_{ij}) = \frac{C_{12ij}(d_{ij})}{(C_{11ij}(0)C_{22j}(0))},$$

where $$C_{12ij}(d) = \sum_x F_{ij}(x+d)G_j(x),$$

$$C_{11ij}(0) = \sum_x F_{ij}(x)F_{ij}(x), \text{ and}$$

$$C_{22j}(0) = \sum_x G_j(x)G_j(x).$$

By computing every $NCC_{ij}(D_{ij})$ of the unknown form against the corresponding data feature in the database, the NCC's of the five best matches are denoted by $NCC_{p1}(D_{p1}), NCC_{q2}(D_{q2}), NCC_{r3}(D_{r3}), NCC_{s4}(D_{s4}), NCC_{t5}(D_{t5}).$ The symbols (p,q,r,s,t) are the five form identification classifications based on the normalized cross correlation operation using the feature of ($F_1$,$F_2$,$F_3$,$F_4$,$F_5$). The features ($D_{p1}$,$D_{q2}$,$D_{r3}$,$D_{s4}$,$D_{t5}$) are the five corresponding displacements. According to the definition of the five features, the $D_{p1}$, $D_{r3}$, and $D_{s4}$ are the vertical offsets of the two registered forms, and the $D_{q2}$ and $D_{t5}$ give the horizontal offset of the two form images. The best choice of a final form identification is made by selecting the majority of the five identification numbers. If no major identification is found, the best choice of an identification is selected by the highest value among the five calculated NCC.

The invention has been described with reference to a preferred embodiment. However, it will be appreciated that variations and modifications can be effected by a person of ordinary skill in the art without departing from the scope of the invention.

| PARTS LIST: | |
|---|---|
| 10 | binary image |
| 20 | assignment function |
| 22 | encoding |
| 24 | look-up-table |
| 26 | extracting contour pixels |
| 30 | construction of vector segments |
| 40 | connecting the vectors |
| 42 | collection of polygons |
| 44 | collection of polygons |
| 50 | known forms |
| 55 | unknown form |
| 60 | scanner |
| 70 | contour vectorization process |
| 72 | contour classifier |
| 74 | line extraction |
| 76 | cross-correlation |
| 78 | skew angle determined |
| 80 | template database |
| 81 | correct outer contours |
| 82 | correct inner contours |
| 83 | calculate height distribution and detect the value of Hm |
| 84 | test for text or graphics inner contours |
| 85 | test for text outer contours |
| 86 | test for graphic outer contours |
| 90 | largest outer polygon contour |
| 92 | connected vectors |
| 102 | collect intersection points |
| 104 | delete pair of adjacent points |
| 106 | calculate distribution of vertical distances of adjacent points |
| 108 | delete pair of adjacent points |
| 109 | calculate skew angle |

I claim:

1. A method for identifying business forms by constructing contour polygons from linear line segments that have been derived from a windowed raster scan of an image of the business form comprising the steps of:

a) detecting the binary values of the pixels within the scanning window as the window is scanned over the image;

b) positioning each of the binary values into an assigned and ordered position forming a string of binary values for each window scan with each string of binary values forming an integer number;

c) directing the formed integer number to a look-up-table that translates each integer number into one or more output template commands;

d) joining linear line segments into at least one contour polygon in response to the one or more output template commands;

e) examining each contour polygon to determine if it represents a text component or a graphic component;

f) grouping all text contour polygons and graphic contour polygons;

g) profiling each of the contour polygons in the text group and the graphics group;

h) accumulating the profiles for each of the groups; and i) comparing the accumulated profiles of step h against a Library of stored profiles of known forms so as to determine a best match thereby identifying the unknown form.

2. The method according to claim 1 wherein the step of examining each contour polygon to determine if it represents a text component or a graphic component is comprised of the steps of:

a) determining the overall slope of each contour polygon; and b) adjusting the slope to zero for each contour polygon so as to remove any skew.

3. A method for identifying business forms by constructing contour polygons from linear line segments that have been derived from a windowed raster scan of an image of the business form comprising the steps of:

a) detecting the binary values of the pixels within the scanning window as the window is scanned over the image;

b) positioning each of the binary values into an assigned and ordered position forming a string of binary values for each window scan with each string of binary values forming an integer number;

c) directing the formed integer number to a look-up-table that translates each integer number into one or more output template commands;

d) joining linear line segments into at least one contour polygon in response to the one or more output template commands;

e) profiling the height distribution of each contour polygon;

f) accumulating the height distribution for all contour polygons;

g) determining the value of the maximal occurrence of the height distribution;

h) setting the maximal value as a threshold value;

i) classifying each of the contour polygons into a text or graphic group based on its maximal value as compared to the set threshold value;

j) profiling each of the contour polygons in the text group and the graphics group;

k) accumulating the profiles for each of the groups; and l) comparing the accumulated profiles of step k against a Library of stored profiles of known forms so as to determine a best match thereby identifying the unknown form.

4. A method for identifying business forms by constructing contour polygons from linear line segments that have been derived from a windowed raster scan of an image comprising the steps of:

a) detecting the binary values of the pixels within the scanning window as the window is scanned over the image;

b) positioning each of the binary values into an assigned and ordered position forming a string of binary values for each window scan with each string of binary values forming an integer number;

c) directing the formed integer number to a look-up-table that translates each integer number into one or more output template commands;

d) joining linear line segments into at least one contour polygon in response to the one or more output template commands;

e) accumulating, along orthogonal axes the values of all contour polygon line segments; and f) comparing the accumulated values of step e against a Library of accumulated values of known forms so as to determine a best match thereby identifying the unknown form.

5. A method for identifying business forms by constructing contour polygons from linear line segments that have been derived from a windowed raster scan of an image comprising the steps of:

a) detecting the binary values of the pixels within the scanning window as the window is scanned over the image;

b) positioning each of the binary values into an assigned and ordered position forming a string of binary values for each window scan with each string of binary values forming an integer number;

c) directing the formed integer number to a look-up-table that translates each integer number into one or more output template commands;

d) joining linear line segments into at least one contour polygon in response to the one or more output template commands;

e) examining each contour polygon to determine if it represents a text component or a graphic component;

f) grouping all text contour polygons and graphic contour polygons;

g) accumulating the bounding values of the contour polygons of each group; and h) comparing the accumulated boundary values of step g against a Library of stored boundary values of known forms so as to determine a best match thereby identifying the unknown form.

* * * * *